Oct. 18, 1927.  
R. P. GREENLEAF  
LOADING SYSTEM  
Filed Dec. 8, 1924  
1,646,197  
3 Sheets-Sheet 3
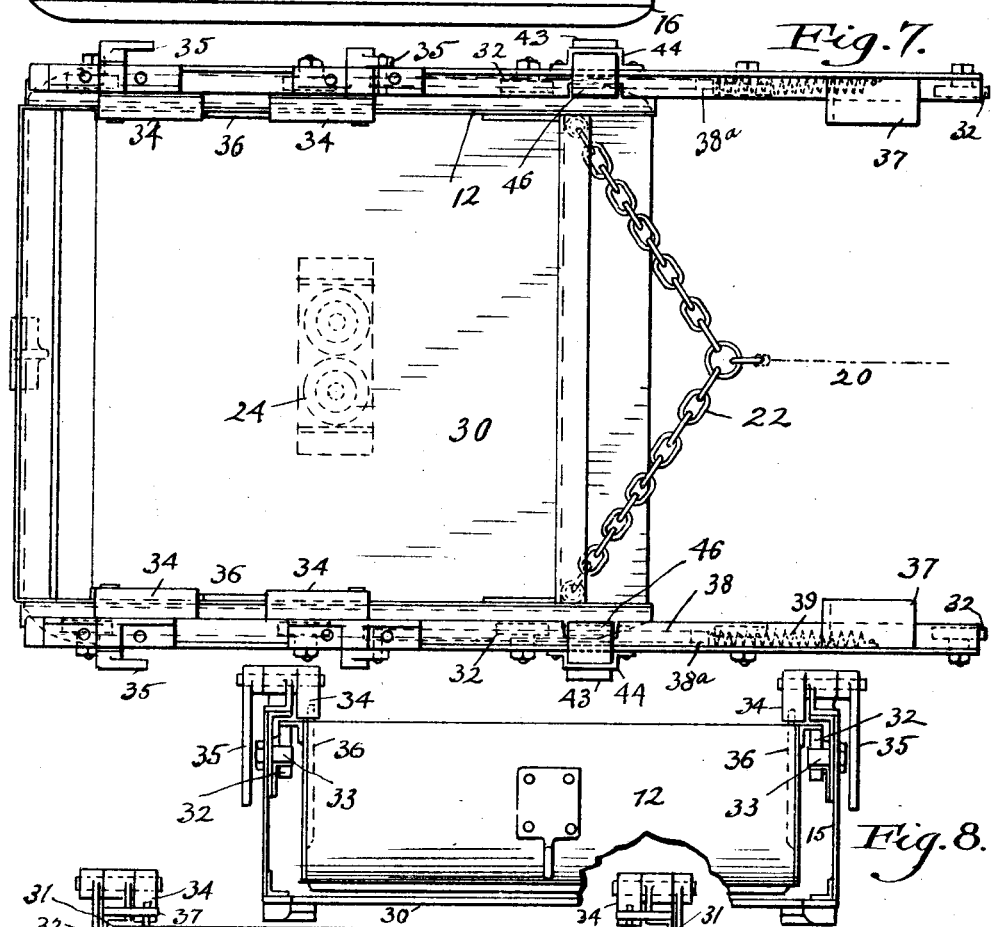

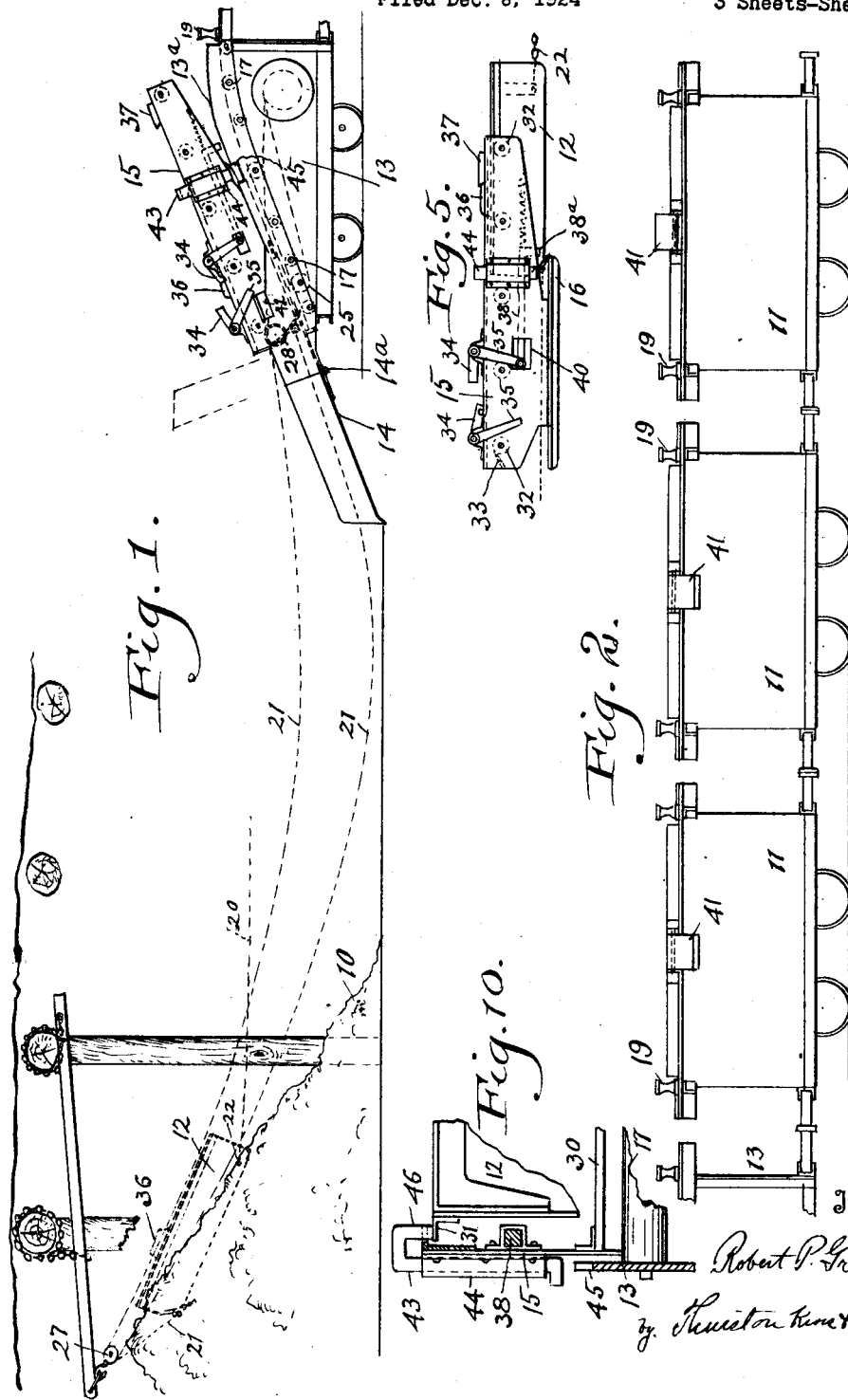

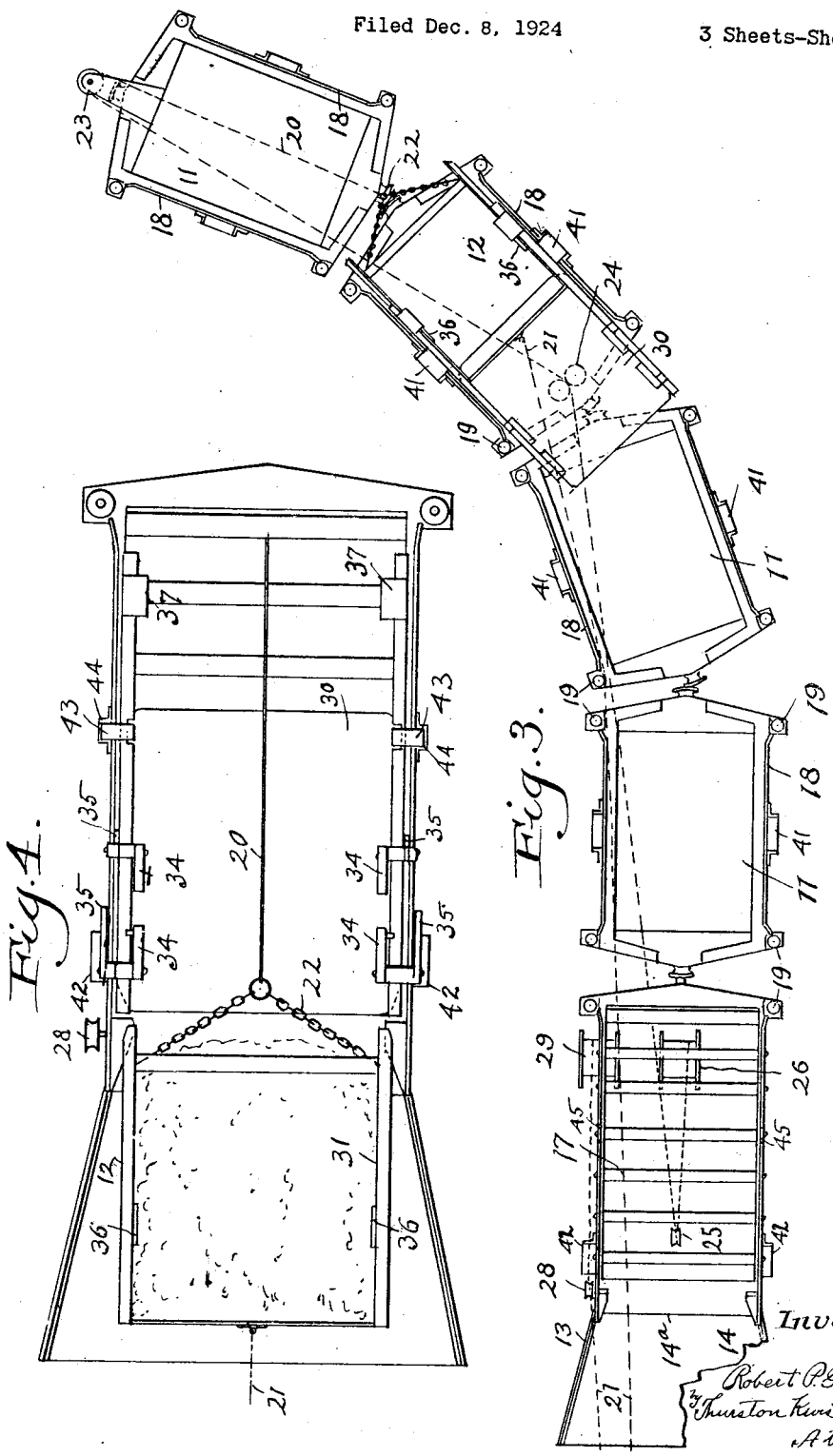

Patented Oct. 18, 1927.

1,646,197

UNITED STATES PATENT OFFICE.

ROBERT P. GREENLEAF, OF SHAKER HEIGHTS, OHIO, ASSIGNOR TO FRANK BILLINGS, OF CLEVELAND, OHIO.

LOADING SYSTEM.

Application filed December 8, 1924. Serial No. 754,549.

This invention relates to loading systems adapted particularly for use in mines, and has for its chief object to provide a system of the type embodying a scraper designed to be pulled over a body of ore or other material to be loaded, and thus receive a load, together with means whereby the scraper with its load of material can be drawn over a series of cars and caused to discharge the material into any one of them.

In another aspect the invention relates to a loading system wherein a series of connected cars are adapted to be filled through the medium of a scraper which is dragged over the material and then moved up to the level of the tops of the cars and along over the cars whether they are standing on a straight track or a curved track, and to accomplish this without any material spillage, particularly as the scraper is moving between cars.

In carrying out my invention a scraper of the bottomless type is preferably employed, i. e. a scraper having a rear digging wall and side-boards projecting forwardly from it, so that a large load can be gathered up by the scraper while being moved over a pile of material, which for convenience will be referred to as ore. Additionally, I provide the equivalent of a carriage for this scraper, in, or onto which the scraper is adapted to be moved as it is drawn toward the cars, the scraper and carriage constituting in effect a two-part or separable skip.
By my invention the two parts are automatically locked together, and then the unit is drawn over the cars, the tops of which are constructed in such a manner as to form a suitable skidway or track capable of supporting the unit when traveling between the cars, as well as on the cars. This carriage not only forms a convenient means for conveying the scraper over the cars, but it forms also a bottom for the scraper which will retain the material in the unit until such time as the discharge is desired. Provision is made also for selectively dumping the unit by temporarily disengaging the parts so that one part, preferably the scraper part, is moved relative to the other part, thus causing the material to be discharged into the car which is to receive the load. Still further, my invention includes means for automatically re-engaging the parts on the return trip so that the unit can travel back over the cars, and automatically dis-engaging the parts when the unit has passed over the foremost car, so as to leave the carriage at its station, ready to again receive the scraper when it is loaded, and so that the scraper may continue forwardly, independently of the carriage, onto the pile of material so as to receive another load. In operating this scraper and the carriage in their to and fro movements, a so-called main and tail rope haulage system is preferably employed, the power for which, may be conveniently located at the head of the series of cars to be filled.

The invention may be further briefly summarized as consisting in certain novel combinations and arrangements of parts, and details of construction which will be described in the specification and set forth in the appended claims.

In the accompanying sheets of drawings wherein I have illustrated an embodiment of the invention which operates with high efficiency, Fig. 1 is a view showing somewhat conventionally a pile of material to be loaded, and showing the scraper and its carriage, with the scraper in position to receive a load, and the carriage on an inclined track of a so-called power unit by which the loading system is operated, and which is preferably located at the head of the cars to be filled; Fig. 2 shows in elevation a series of cars adapted to be filled with my improved system, the foremost of these cars being adapted to be located next to the power unit at the right-hand side of Fig. 1; Fig. 3 is a plan view of the series of cars and of the power unit showing also the haulage system; Fig. 4 is an enlarged plan view of the power unit showing both the scraper and the carriage, with the former about to ride up onto the carriage for transport over the cars; Fig. 5 (Sheet 1) is a side view of the skip unit with the scraper pulled forwardly relative to the carriage, as occurs in the dumping operation,—that is in discharging the material from the skip unit into a car; Fig. 6 is a side elevation of the skip unit, composed of the carriage and scraper, when the parts are locked together for transport over the cars; Fig. 7 is a plan view of the same; Fig. 8 is a rear view of the same; Fig. 9 is a front view; and Fig. 10 is a detail sectional view showing a latch by which the carriage is held from movement on the power unit until the scraper is properly positioned thereon.

Referring now to the drawings, 10 represents a pile of material which is to be loaded into a series of cars 11, of which there may be any number, and which may be typical mine cars, modified, however, at the top to form a suitable trackway for the skip or skip unit. The material is moved from the pile into the cars in accordance with the present invention by a scraper 12, which is shown in Fig. 1 on the pile of material. As stated in the early part of the specification, the scraper is preferably of the bottomless type, in which event it will include a rear digging wall and forwardly projecting and generally parallel side walls, although this is not an essential feature of the scraper. In Fig. 1 the scraper is shown near the upper part of the pile of material 10, and it may be assumed that the scraper is filled by drawing it downwardly and forwardly over the pile of material and then over the intervening space between the latter and the cars. However, a construction of scraper may be employed wherein the scraper may be filled by both forward and rearward movements over the material, in case it is not filled by one trip in a forward direction. Scrapers of this type are well-known, and need not be further described, especially as the scraper used with my invention requires no particular form or construction aside from certain details which are provided to adapt the scraper for use in attaining the objects and advantages of my improved loading system.

At the head of the series of cars I provide what may be termed a power unit 13, which in the present embodiment is provided with power-operated rope drums for the main and tail ropes of the haulage system used in operating the scraper and skip unit. The power unit 13 is provided with an inclined top 13ª, at the lower end of which is a chute-like inclined extension 14 extending down to the ground so that the scraper may be pulled up onto the power unit after traversing the ground space between the pile of material and the power unit. The chute 14 is hinged at 14ᵇ, not only to adapt the device for varying ground levels, but also so that it may be swung up out of the road when the power unit is being transported from one point to another.

In Fig. 1 I have shown on the inclined top of the power unit a carriage 15, onto which the loaded skip is adapted to ride, as previously explained, which carriage, as already stated, is adapted to travel over the tops of the cars so as to transport the scraper and to form a bottom for the scraper so as to prevent the spillage of material, especially when the unit is being moved from one car to another, or from the power unit to the foremost car.

A system involving the use of a carriage such as shown at 15, requires a suitable trackway on the power unit, and at the tops of the cars, and preferably this trackway should be so designed with respect to the carriage that the latter can travel over and between the cars whether the latter are on a straight track or a curved track. The trackway and the trackway engaging portion of the carriage may assume different forms, but in this instance the carriage is provided with skids or runners 16 (see particularly the enlarged views on Sheet 3), and these runners are adapted to travel over a series of rollers 17 at the top of the power unit, which rollers are located in an inclined plane, and additionally the runners 16 of the carriage are adapted to travel over flanged trackways 18, formed at the tops of the cars, which are also provided at their four corners with upright guiding rollers 19, which assist in guiding or directing the carriage between cars, particularly when they are standing on a curved track. By the trackway means shown, the carriage can be caused to travel back or forward over the tops of the cars without dropping between the cars, and without spilling the material carried by the skip unit. In my prior application, Serial No. 698,632, filed March 12, 1924, I have shown several trackway systems on cars adapted to accommodate a skip, which systems I regard as comparable with that shown in this application. In said prior application, the bottom of the skip is shown as provided with rollers, and the tops of the cars with skip rails. I also show in said application a modification wherein the skip is provided with runners and the trackway on the cars and on the power unit is formed by rollers. Any suitable combination of trackway parts on the cars and co-operating parts on the skip may be employed, such, for example, as shown in this application, or in my prior application referred to, as long as they permit the skip to travel along the cars and from one car to another when the cars are standing on the sharpest curves for which the cars by their construction are adapted, which curves are usually very sharp in mine work.

The scraper is adapted to be moved toward and over the cars by a head rope 20, and forwardly or toward the material by a tail rope 21. The head rope is attached to the scraper as shown at 22 in Figs. 4 and 7, and from the scraper it extends to the end of the rearmost car, where it passes about a sheave 23. From the sheave 23 the head rope passes forwardly between a pair of guide sheaves 24 on the bottom of the carriage, as shown in Figs. 3, 7 and 9, then forwardly still further around a sheave 25, located near the lower end of the power unit (see Fig. 3), and then back around a power operated drum 26.

The tail rope 21 is attached to the scraper, as clearly shown in Fig. 4, and then extends forwardly around a sheave 27, supported in advance of the pile of material 10 by the mine timbering, or otherwise. From this sheave the tail rope extends back alongside the chute or power unit extension 14, over a guide sheave 28 (see Fig. 3) and around a power-operated drum 29.

The particular haulage system illustrated and described, can be used to advantage, but, of course, it may be modified in many particulars, especially as to the location of guide sheaves, etc. It will be understood that a suitable source of power will be mounted on the power unit for operating the rope drums, which can be controlled in any desired manner.

Let it be assumed that the scraper is filled by being pulled back down the pile of material by means of the head rope 20. After being filled in this manner, it is pulled over the ground and up onto the power unit, of course first up the inclined chute 14. During this time the carriage 15 stands preferably on the inclined top of the power unit, as shown in Fig. 1, it being important that the bottom plate 30 of the carriage abut against the uppermost end of the bottom of the inclined shute 14, so as to avoid spillage of material as the scraper rides up and passes from the chute 14 onto the carriage. Further movement of the scraper by the head rope pulls it up onto the carriage, and to bring this about, the sides of the scraper are provided with outwardly extending flanges 31, which flanges ride up onto rollers 32, which are supported on the sides of the carriage, as shown in Figs. 6 and 7. If necessary, inclined guides, which I have shown at 33 (Fig. 6) may be employed to guide the flanges of the scraper up onto the first rollers, but these are not essential inasmuch as the lift of the scraper when riding up onto the rollers 32 is very slight.

The scraper thus rides up onto the carriage, and when it reaches a given position thereon, it is locked thereto so as to form a skip unit equivalent to that shown in my prior application above referred to, and in an earlier application filed in the name of Frank Billings and myself, Serial No. 621,- 999, filed March 1, 1923. The means by which the two parts of the skip unit are automatically locked together when the scraper rides up onto the carriage is as follows:

I arrange on opposite sides of the carriage 15, two pairs of bell cranks having arms 34 in the form of pawls, and also having arms 35 which extend down along the outer sides of the carriage. Additionally, I provide on the sides of the scraper, lugs 36, which when the scraper rides onto the carriage are in the path of the pawls 34. When the scraper rides onto the carriage, these lugs pass under the pawls 34 of the first pair of bell cranks, but engage the pawls of the second pair of bell cranks, as shown in Fig. 6. It is the engagement of the lugs 36 with these last mentioned pawls that locks the scraper to the carriage when it is drawn back preparatory to traveling over the cars. Obviously, therefore, if the movement of the head or main rope attached to the scraper is continued after the engagement of the lugs 36 with the second pair of pawls 34, the entire unit is pulled rearwardly (with respect to the pile of material) beyond the power unit onto and over the cars.

To bring about the dumping of the skip unit into any selected car, it is only necessary to disengage the pawls 34 from the lugs 36, in which event the continued pull on the main or head rope will advance the scraper relative to the carriage, with the result that the material carried by the skip unit will be scraped off the carriage bottom and into the car designed to receive the load. The scraper and carriage will then occupy the relative positions shown in Fig. 5, the movement of the scraper relative to the carriage continuing until the lugs 36 engage stop lugs 37 near the ends of rearwardly projecting arms of the carriage. This engagement is shown in Fig. 5.

The unlocking of the scraper and carriage over any of the cars to be loaded is brought about by the following means: I connect to the lower ends of the arms 35 of the rear pair of bell cranks, releasing bars 38 which are normally held in their forwardmost positions by springs 39, these bars having downturned rear ends shown clearly in Fig. 6. These bars, are in this instance, guided for horizontal movement on the inner sides of the carriage, and are connected with the lower ends of the rear pair of bell crank arms 35, through openings 40 in the sides of the carriage (see Fig. 6). I also provide means whereby at the desired dumping point the releasing bars are actuated so as to rock the bell cranks to which they are connected, and cause the pawls thereof to be shifted out of engagement with the lugs 36, and to bring this about, the downturned ends 38ª at the forward ends of the bars 38 are arranged to engage abutments adapted to function on any of the cars. The abutments may be moved about from car to car and positioned on any of them, as in the prior applications referred to, but in this instance they are pivotally supported on the cars, as shown at 41. They may be swung downward to inoperative position, as shown on the first two cars of Fig. 2, and they may be swung upwardly to operative position, as shown on the right hand car of Fig. 2.

When the rear or advancing ends of the bars 38 engage a pair of these abutments on opposite sides of any one of the cars, the scraper is unlatched from the carriage and moves back, scraping the material into the car, as already stated. When the scraper has been moved back its full distance relative to the carriage, the pull on the main rope is discontinued. The tail rope is now wound onto the drum, and the first movement returns the scraper to its normal position on the carriage, and again the scraper is latched to the carriage when the lugs 36 engage the pawls of the forward pair of bell cranks. That is to say, the lugs now pass under the pawls which the lugs previously engaged to lock the skip to the carriage.

The skip unit is now drawn forwardly over the cars and to the inclined top of the power unit, and when it reaches the position shown in Fig. 1, the forward pawls are lifted from engagement with the lugs 36 by the arms 35 of the forward pair of bell cranks engaging suitable abutments 42 positioned on the sides of the power unit, as shown in Fig. 1. This again disengages the scraper from the carriage, so that further pull on the tail rope causes the scraper to leave the carriage, which remains standing on the power unit, whereupon the scraper is returned to the pile for another load.

In this manner the cars can be filled one after another by the back and forward movements of the scraper which automatically is connected to the carriage when it reaches the carriage on the power unit, and is automatically unlocked from the carriage to permit the dumping of the skip. Then when the tail rope is wound in, the scraper is returned to normal position on the carriage and locked thereto until the skip unit is returned to the power unit, when the scraper is again automatically unlocked, leaving the carriage on the power unit with its bottom plate in engagement with the upper edge of the chute bottom, while the scraper continues on to get another load.

It may be desirable to lock the carriage in definite position on the power unit when the carriage reaches the position where the scraper leaves it and passes onto the pile, and to release the carriage when the scraper has been pulled up onto it, so as to avoid likelihood of premature movement of the carriage while the scraper is being pulled up onto it. This can be done by automatically operated latches or bolts, such as indicated in the drawings at 43. The latches here shown are in the form of vertically movable slides mounted in guides 44 on the outer sides of the carriage, and adapted to engage at their lower ends in notches 45 provided in the sides of the power unit, this engagement taking place when the carriage comes to a stop on the power unit, and the scraper moves down off of it. The latches here shown have hook-shaped upper portions which extend inwardly and then downwardly, and the downwardly extended ends, designated 46, are inclined, the arrangement being such that on the final movement of the scraper onto the carriage the forward ends of the flanges 31 of the scraper engage the inclined portions of the latches and lift them upward clear of the notches 45, thus unlocking the carriage from the power unit. In this way any tendency of the carriage to move off the power unit before the scraper is properly positioned thereon is avoided, and the carriage is released for movement just prior to the engagement of the lugs 36 with the pawls 34. In Fig. 10 I have shown a detail of one of the latches 43, and the same are also indicated in the other figures, except Figs. 8 and 9, from which they have been omitted for the sake of clearness.

I do not desire to be confined to the precise details and arrangements shown, but aim in my claims to cover all modifications which do not involve a departure from the spirit and scope of my invention as defined in the appended claims.

Having described my invention, I claim:

1. In a loading system by which material may be loaded into cars, an open bottom scraper, means for moving the scraper back and forth between the material and the cars so that it may receive loads and convey the same to the cars, and a member adapted to form a bottom for the scraper and onto which the scraper moves and is connected in its movement toward the cars, and from which it is disconnected on its return trip for another load.

2. In a loading system for filling cars, a plurality of cars connected together, a skip adapted to travel over said cars and discharge the material therein, said skip being composed of two separable parts including a scraper member and a carriage.

3. In a loading system for filling a series of cars, a skip composed of two separable members consisting of a scraper and a carriage or support therefor, means connected to the scraper for moving it back and forth, and means for forming an interlocking connection between the scraper and carriage for a portion of the travel of the scraper.

4. In a loading system for filling a series of cars, a skip composed of two separable members consisting of a scraper and a carriage or support therefor, means connected to the scraper for moving it back and forth, and means for automatically interlocking the scraper and carriage at a given point in the travel of the scraper.

5. In a loading system by which material may be loaded into a series of cars, a skip adapted to travel over the cars and to be dumped into any one of them, said skip being composed of a scraper and a carriage onto which the filled scraper is adapted to move and to be connected, means attached to the scraper to actuate the same, and means for automatically disconnecting the scraper and carriage for a predetermined relative movement at the dumping point.

6. In a loading system by which material may be loaded into a series of cars, a skip adapted to travel over the cars and to be dumped into any one of them, said skip being composed of a scraper and a carriage onto which the filled scraper is adapted to move and to be connected, means attached to the scraper to actuate the same, and means for automatically disconnecting the scraper and carriage on the return movement of the skip.

7. In a loading system by which material may be loaded into a series of cars, a skip adapted to travel over the cars and to be dumped into any one of them, said skip being composed of a scraper and a carriage onto which the filled scraper is adapted to move and to be connected, means attached to the scraper to actuate the same, and means for latching together the scraper and carriage when the scraper reaches a given point in its travel toward the cars and for unlatching them on the return movement.

8. In a loading system by which material may be loaded into a series of cars, a skip adapted to travel over the cars and to be dumped into any one of them, said skip being composed of a scraper and a carriage onto which the filled scraper is adapted to move and to be connected, means attached to the scraper to actuate the same, and means for automatically latching the parts together during the movement of the scraper toward the cars and for automatically unlatching them during the reverse movement.

9. In a loading system by which material may be loaded into a series of cars, a skip for conveying the material over the cars and composed of two separable parts including a scraper and a carriage, means connected to the scraper for moving the same over the material to receive a load and up onto the carriage, means for latching the scraper to the carriage so that they may travel as a unit over the cars, means for unlatching them at the dumping point, means for again latching them at the start of the return trip, and means for again unlatching them when the unit has been moved beyond the foremost car whereby the scraper may leave the carriage to receive another load.

10. In loading system for loading material into a series of cars, an inclined member leading up to the top of the foremost car, a carriage adapted to travel over the cars, and a scraper adapted to ride up onto the carriage and to be supported thereby, and means connected to the scraper for moving the same back and forth.

11. In a loading system, a series of cars having a skip trackway at the top thereof, a skip composed of a carriage adapted to travel back and forth over the cars, and a scraper adapted to move onto the carriage after being filled, and haulage means for moving the scraper independently of the carriage and for moving the scraper and carriage as a unit.

12. In a loading system for loading material into cars, a plurality of cars connected together, a scraper, a haulage system by which the scraper may be filled and moved toward and over said cars, and a carriage with which the scraper is adapted to be connected at a point in its travel.

13. In a loading system for filling cars, a plurality of cars connected together, a skip adapted to travel over said cars and discharge the material therein, said skip being composed of two separable parts including a scraper member and a carriage, and means connected to the scraper member for moving said skip over said cars.

In testimony whereof, I hereunto affix my signature.

ROBERT P. GREENLEAF.